UNITED STATES PATENT OFFICE.

JOSEPH H. AMIES, OF SCRANTON, ASSIGNOR TO CHARLES W. KENNEDY, OF PHILADELPHIA, PENNSYLVANIA.

PROCESS OF MAKING PLASTIC COMPOSITIONS.

SPECIFICATION forming part of Letters Patent No. 469,111, dated February 16, 1892.

Application filed February 24, 1891. Renewed December 12, 1891. Serial No. 414,845. (No specimens.)

*To all whom it may concern:*

Be it known that I, JOSEPH H. AMIES, a citizen of the United States, and a resident of Scranton, in the county of Lackawanna and State of Pennsylvania, have invented certain new and useful Improvements in Processes of Making Plastic Compositions; and I do hereby declare that the following is a full, clear, and exact description of the invention, which will enable others skilled in the art to which it appertains to make and use the same, reference being had to the accompanying drawings, which form a part of this specification.

My invention relates to improvements in processes for making plastic compounds or compositions.

The object of the invention is to provide a novel process for making plastic compounds which may be advantageously employed as a substitute for lumber, siding, flooring, roofing, beams, columns, and for manufacturing railroad ties or sleepers, as well as for building-stone, tiling, paving, and for many other useful purposes; and with this object in view the invention consists in the novel process which will be hereinafter fully described, and specifically defined in the claim.

In carrying my invention into effect I take a tank of any suitable dimensions and shape and partly fill the same with water. I then add to the water a sufficient quantity of long fibrous tentacles of hemp, jute, or other similar material. A quivering motion is then given to the tank, which will be found to have the effect of loosely weaving or intermingling the fibers or matting them together. I then add a sufficient quantity of finely-powdered hydraulic or other suitable cement to coat or cover the matted fibers, after which I add a filling of any suitable elastic scrap or waste—such as small pieces of wood, sawdust, or paper cuttings or clippings—the quivering action or motion of the mixing tank or vessel still being maintained. The mass will now assume a pulpy character and is in condition to be transferred to suitable molds or dies, in which it is subjected to pressure, whereby the water is expelled and a compact spongy body obtained, which when dry may be advantageously employed for the purposes hereinbefore enumerated, as nails or spikes can be readily driven therein and will be tenaciously held thereby.

The proportions of the substances used should be about fifty per cent., in bulk, of fiber, twenty-five per cent. cement, and twenty-five per cent. of filling material, with sufficient water to form a plastic or pulpy mass when all of the ingredients shall have been incorporated. It will be obvious, however, that these proportions may be varied according to circumstances and the nature of the compound or composition to be produced.

It is necessary that the fibers should be what are known as "long" fibers, the longer the better, so that they will be interwoven or intermingled, so as to mat together when subjected to the quivering action while suspended in the water in the tank. The amount of cement used must be sufficient to exclude moisture and avoid swelling and maintain the spongy nature of the product, so as to tenaciously hold nails, screws, or spikes. This may be regulated by adjusting the amount of pressure to which the mass is subjected and properly proportioning the amount of filling material and cements contained therein.

Having thus described my invention, I claim and desire to secure by Letters Patent of the United States—

The hereinbefore-described process of producing plastic compounds or compositions, the same consisting in subjecting long fibrous tentacles to a quivering action while suspended in water in a suitable vessel, then adding thereto a suitable cement, next adding a filling of elastic waste or scrap, the quivering action still being maintained, and finally subjecting this mass to pressure to compact the same and expel the water, substantially as described.

In testimony that I claim the foregoing as my own I have hereunto affixed my signature in presence of two witnesses.

JOSEPH H. AMIES.

Witnesses:
ARTHUR B. SEIBOLD,
BENNETT S. JONES.